US009521632B2

(12) United States Patent
Narasimha et al.

(10) Patent No.: US 9,521,632 B2
(45) Date of Patent: Dec. 13, 2016

(54) POWER ALLOCATION FOR OVERLAPPING TRANSMISSION WHEN MULTIPLE TIMING ADVANCES ARE USED

(75) Inventors: Murali Narasimha, Lake Zurich, IL (US); Vijay Nangia, Algonquin, IL (US); Ravikiran Nory, Buffalo Grove, IL (US); Sandeep H. Krishnamurthy, Arlington Heights, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 873 days.

(21) Appl. No.: 13/209,863

(22) Filed: Aug. 15, 2011

(65) Prior Publication Data

US 2013/0044831 A1 Feb. 21, 2013

Related U.S. Application Data

(60) Provisional application No. 61/523,496, filed on Aug. 15, 2011.

(51) Int. Cl.
*H04W 52/36* (2009.01)
*H04W 52/34* (2009.01)

(52) U.S. Cl.
CPC ......... *H04W 52/365* (2013.01); *H04W 52/346* (2013.01)

(58) Field of Classification Search
CPC ....... H04J 3/0682; H04W 52/34; H04W 52/03
See application file for complete search history.

(56) References Cited

U.S. PATENT DOCUMENTS

| | | | | |
|---|---|---|---|---|
| 6,373,833 | B1 * | 4/2002 | Suonvieri et al. | 370/347 |
| 7,539,123 | B2 | 5/2009 | Rhodes | |
| 7,688,784 | B2 | 3/2010 | Bitran et al. | |
| 8,140,102 | B2 | 3/2012 | Nory et al. | |
| 8,451,749 | B2 * | 5/2013 | Tanaka et al. | 370/253 |
| 8,559,999 | B2 * | 10/2013 | Hu et al. | 455/522 |
| 2007/0076679 | A1 * | 4/2007 | Lee | 370/348 |
| 2007/0147331 | A1 * | 6/2007 | Bi et al. | 370/346 |
| 2007/0173260 | A1 | 7/2007 | Love et al. | |
| 2007/0173276 | A1 | 7/2007 | Love et al. | |
| 2007/0177501 | A1 * | 8/2007 | Papasakellariou | 370/229 |
| 2007/0298802 | A1 * | 12/2007 | Kaminski | 455/436 |
| 2008/0025254 | A1 | 1/2008 | Love et al. | |
| 2008/0259846 | A1 * | 10/2008 | Gonikberg et al. | 370/328 |

(Continued)

FOREIGN PATENT DOCUMENTS

| | | | |
|---|---|---|---|
| JP | 2006-217190 | A | 8/2006 |
| WO | 2007-139459 | A1 | 12/2007 |
| WO | 2011-050921 | A1 | 5/2011 |

OTHER PUBLICATIONS

3GPP TSG RAN WG2 #73, R2-110713 "LS on UE Receiver Window for Inter-Band Non-Contiguous CA" RAN WG4, Taipei, Taiwan; Feb. 21-25, 2011, 3 pages.

(Continued)

*Primary Examiner* — Cindy Trandai
(74) *Attorney, Agent, or Firm* — Faegre Baker Daniels LLP

(57) ABSTRACT

A method and apparatus for power allocation for overlapping transmissions is provided herein. During operation, user equipment will determine if transmissions to a single base station, on various frequencies, will be overlapping. If so, a determination is made to back off the power for at least one transmission on one frequency.

18 Claims, 12 Drawing Sheets

(56) References Cited

U.S. PATENT DOCUMENTS

| | | | | |
|---|---|---|---|---|
| 2009/0063604 | A1* | 3/2009 | Tan | 708/404 |
| 2009/0154446 | A1* | 6/2009 | Adler et al. | 370/350 |
| 2009/0196245 | A1 | 8/2009 | Ji | |
| 2010/0061326 | A1 | 3/2010 | Lee et al. | |
| 2010/0067469 | A1* | 3/2010 | Gaal | H04W 72/082 370/329 |
| 2010/0120446 | A1 | 5/2010 | Gaal | |
| 2010/0226296 | A1* | 9/2010 | Wala et al. | 370/294 |
| 2010/0232373 | A1 | 9/2010 | Nory et al. | |
| 2010/0273515 | A1 | 10/2010 | Fabien et al. | |
| 2010/0273520 | A1 | 10/2010 | Pelletier et al. | |
| 2010/0297993 | A1 | 11/2010 | Heo et al. | |
| 2010/0322287 | A1* | 12/2010 | Truong et al. | 375/133 |
| 2011/0009136 | A1 | 1/2011 | Mantravadi et al. | |
| 2011/0158117 | A1* | 6/2011 | Ho et al. | 370/252 |
| 2011/0158194 | A1* | 6/2011 | Musikka et al. | 370/329 |
| 2011/0256833 | A1* | 10/2011 | Racz et al. | 455/63.1 |
| 2011/0275335 | A1 | 11/2011 | Luo et al. | |
| 2011/0275403 | A1 | 11/2011 | Chen et al. | |
| 2011/0305146 | A1* | 12/2011 | Rausch et al. | 370/252 |
| 2012/0008563 | A1 | 1/2012 | Johansson et al. | |
| 2012/0088455 | A1 | 4/2012 | Love et al. | |
| 2012/0178482 | A1* | 7/2012 | Seo et al. | 455/501 |
| 2012/0184265 | A1 | 7/2012 | Love et al. | |
| 2012/0184327 | A1 | 7/2012 | Love et al. | |
| 2012/0236735 | A1 | 9/2012 | Nory et al. | |
| 2012/0257519 | A1* | 10/2012 | Frank et al. | 370/252 |
| 2013/0229971 | A1* | 9/2013 | Siomina | H04W 24/10 370/312 |

OTHER PUBLICATIONS

3GPP TSG RAN WG1 #63, R1-106348 "Definition of Pcmax,c" Qualcomm Inc.; Jacksonville, FL; Nov. 15-19, 2010, 5 pages.

Muhammad and Mohammed, "Performance Evaluation of Uplink Closed Loop Power Control for LTE System" Vehicular Technology Conference, IEEE 70th; Sep. 20-23, 2009, 5 pages.

Shen et al., "Overview of 3GPP LTE-Advanced Carrier Aggregation for 4G Wireless Communications" IEEE Communications Magazine, LTE-Advanced and 4G Wirless Communications; Feb. 2012, 9 pages.

He et al., "Power Scaling Method for Uplink Power Control with Carrier Aggregation" 2011 Third International Conference on Measuring Technology and Mechatronics Automation—vol. 2, 4 pages.

Wang et al., Uplink Component Carrier Selection for LTE-Advanced Systems with Carrier Aggregation, 2011 IEEE International Conference on Communications, Jun. 5-9, 2011, 5 pages.

Patent Cooperation Treaty, "PCT Search Report and Written Opinion of the International Searching Authority" for International Application No. PCT/US2012/046844 dated Nov. 8, 2012, 21 pages.

3GPP TSG RAN WG2 #74, R2-113015 "Discussion on RACH Based Solution and Timing Difference Based Solution" Renesas Mobile Europe; Barcelona, Spain; May 9-13, 2011, 4 pages.

3GPP TSG RAN WG1 #58, R1-093395 "UL Transmission Power Control in LTE-A" Samsung; Shenzhen, China; Aug. 24-28, 2009, 6 pages.

3GPP TSG RAN WG1 #68, R1-120286 "Consideration on Issues Related to Multiple TA" ZTE; Dresden, Germany; Feb. 6-10, 2012, 8 pages.

3GPP TSG RAN WG1 #61bis, R1-103792 "Remaining Issues on Uplink Power Control" Nokia Siemens Networks, Nokia Corporation; Dresden, Germany; Jun. 28-Jul. 2, 2010, 6 pages.

3GPP TSG RAN1 #50, R1-07xxxx "Effect of UE transmit power adjustments on EUTRA UL" Motorola, Athens Greece, Aug. 20-29, 2007, 7 pages.

3GPP TSG RAN1 #50, R1-07xxxx "UE Transmit Power Accuracy & Calibration" Motorola, Athens Greece, Aug. 20-29, 2007, 5 pages.

3GPP TSG RAN1 #49bis, R1-073224 "Way Forward on Power Control of PUSCH" Catt et al., Orlando, USA Jun. 25-29, 2007, 1 page.

3GPP TSG-RAN2 Meeting #71bis, R2-105960, 36.321 Change Request "Introduction of Carrier Aggregation" Ericsson, Xian, China, Oct. 11-15, 2010, 4 pages.

3GPP TSG RAN WG1 Meeting #58bis, R1-094274 "Uplink Power Control for Carrier Aggregation" Ericsson, ST-Ericsson; Miyazaki, Japan, Oct. 12-16, 2009, 4 pages.

TSG-RAN WG1 Meeting #62, R1-105761 "Way forward on PHR" Panasonic et al., Xian, China, Oct. 11-15, 2010, 2 pages.

3GPP RAN WG1 Meeting #62, R1-105802 "WF on PHR reference formats" Ericsson et al., Xian, China Oct. 11-15, 2010, 2 pages.

Qualcomm Europe: "Signaling for spatial coordination in DL CoMP", 3GPP TSG-RAN WG1 #58, R1-093141, Aug. 24-28, 2009, Shenzhen, China, all pages.

Motorola: "EUTRA Uplink Macro-diversity", 3GPP TSG RAN WG1 #42, R1-050717, London, U.K., Aug. 29-Sep. 2, 2005, all pages.

NTT DOCOMO: "Downlink Interference Coordination Between eNodeB and Home eNodeB", TSG-RAN Working Group 4 (Radio) meeting #52, R4-093203, Shenzhen, Aug. 24-28, 2009, all pages.

Institute for Information Industry (III), Coiler Corporation: "Interference mitigation for HeNBs by channel measurements", 3GPP TSG RAN WG4 Meeting #52, R4-093196, Shenzhen, China, Aug. 24-28, 2009, all pages.

CMCC: "Downlink interference coordination between HeNBs", 3GPP TSG-RAN WG4 Meeting #52, R4-092872, Shenzhen, China, Aug. 24-28, 2009, all pages.

Korean Intellectual Property Office, Notice of Preliminary Rejection for Korean Patent Application No. 10-2014-7003725 (related to above-captioned patent application), mailed Jul. 19, 2015.

* cited by examiner

300

POWER ALLOCATION FOR OVERLAPPING TRANSMISSION WHEN MULTIPLE TIMING ADVANCES ARE USED

FIELD OF THE INVENTION

The present invention relates generally to communication systems and in particular, to power allocation for overlapping transmissions when multiple timing advances are used.

BACKGROUND OF THE INVENTION

Remote Radio Heads (RRHs) are used to extend coverage of a base station. As part of the work on carrier aggregation, next-generation cellular communication systems will support carrier aggregation of frequencies on which RRHs are deployed. Carrier Aggregation will be used to provide improved data rates to users. Carrier aggregation consists of transmitting data to or receiving data from the user equipment (UE) on multiple carrier frequencies ("component carriers"). The wider bandwidth enables higher data rates.

A UE can be configured with a set of component carrier (CCs). Specifically, the UE is configured with a cell on each component carrier. Some of these cells may be activated. The activated cells can be used to send and receive data (i.e., the activated cells can be used for scheduling). When there is a need for aggregating multiple CCs (e.g., a large burst of data), the network can activate configured cells on one or more of the CCs. There is a designated primary cell (Pcell) on a CC that is referred to as the primary CC, which is always activated. The other configured cells are referred to as SCells (and the corresponding CCs are referred to as secondary CCs).

RRHs are deployed on a different frequency than the frequency used by the base station site and provide hot-spot like coverage on that frequency. User equipment (UE) that is in such a hot-spot can perform carrier aggregation of the frequency used by the base station and the frequency used by the RRH and obtain corresponding throughput benefits. RRHs do not embody typical base station functionalities such as higher layer processing, scheduling etc. The baseband signal transmitted by an RRH is generated by the base station and is carried to the RRH by a high speed wired (e.g., optical) link. Thus RRHs function as remote antenna units of a base station, with a high speed link to the base station.

A base station 101, RRH 102, and UE 103 are shown in FIG. 1. As is evident, a non-wireless link 104 exists between base station 101 and RRH 102. The transmissions to UE 102 occur both from base station 101 and from RRH 102, except that the transmissions from base station 101 exist on a different frequency than the transmissions from RRH 102.

The presence of RRHs introduces additional physical locations from which the UE can receive the base station signal (i.e., in addition to receiving the base station signal directly from the base station). In addition, there is a delay introduced by the communication between the base station and the RRH. This delay results in the UE perceiving very different propagation delays on the frequency used by the base station and the frequency used by the RRH. As a consequence, the timing advance applied to the two frequencies need to be different.

The base station assigns a timing advance to a UE to ensure that the uplink transmission by the UE is received at the base station at the same time as the downlink transmission is started (reception of uplink subframe boundary is aligned to transmission of downlink subframe boundary).

Furthermore, the base station ensures that uplink transmissions by different UEs are received at the same time, by assigning different UEs different timing advances (based on the propagation delay).

For carrier aggregation with a single timing advance (i.e., same timing advance is used for all participating uplink CCs), the uplink transmissions are time aligned. However, in the presence of RRHs this assumption is no longer valid.

FIG. 2 shows the timing relationships between downlink and uplink transmissions of the two frequencies. In particular, downlink (DL) transmission (Tx) is shown on frequency 1 (F1) as subframe 201, DL reception (Rx) is shown on F1 as subframe 202, UL Tx is shown on F1 as subframe 203, UL Rx is shown on F1 as subframe 204. In a similar manner DL Tx is shown on F2 as subframe 205, DL Rx is shown on F2 as subframe 206, UL Tx is shown on F2 as subframe 207, and UL Rx is shown on F2 as subframe 208.

It is assumed that base station 101 tries to ensure that uplink transmissions on F1 and F2 are received at the same time. Transmissions on F2 through RRH 102 (both uplink and downlink) have an additional delay due to transmission through fiber link 104 and the associated RRH processing. This additional delay can be as large as 30 microseconds. As shown in FIG. 2, in order for the F2 uplink to arrive at the base station at the same time as the F1 uplink, the timing advance applied by the UE for transmissions on F2 has to compensate for the fiber and RRH processing delay.

As a result, the uplink subframes 203, 204,207, and 208 on F1 and F2 are not time aligned. In FIG. 2, F2 uplink subframe 207 starts before F1 uplink subframe 203. Specifically, the last symbol of uplink subframe n−1 on F1 overlaps the first symbol of uplink subframe n on F2. If a UE is required to transmit in both subframe n−1 on F1 and subframe n on F2, the power available to transmit the last symbol of subframe n−1 on F1 or the first symbol of subframe n on F2 may be limited. For example, if the UE is at the edge of the macro cell, the UE may not be able to transmit at the required power since the power required during the overlapping symbol may exceed the SAR limit. Therefore a need exists for a method and apparatus for power allocation for overlapping transmissions when multiple timing advances are used that reduces a number of times a mobile unit may be unable to transmit because its transmissions exceed the SAR limit.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to alleviate the above-mentioned need, a method and apparatus for power allocation for overlapping transmissions is provided herein. During operation, user equipment will determine if transmissions to a single base station, on various frequencies, will be overlapping. If so, a determination is made to back off the power for at least one transmission on one frequency. Because the power will be reduced to at least one transmission when the frequencies overlap, transmit power during the overlapping symbol will not exceed the SAR limit.

Figure 1:
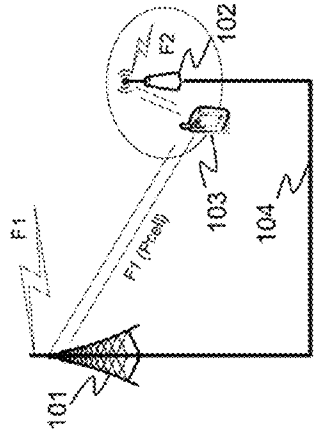
FIG. 1 shows a communication system employing a radio-relay head.
Figure 3:
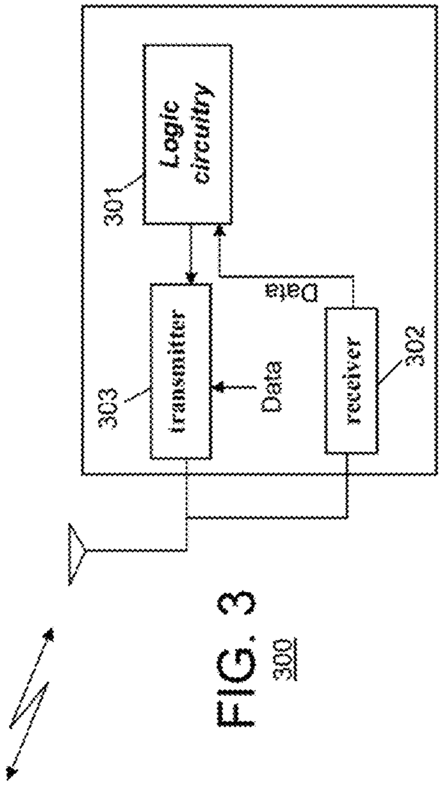
FIG. 3. is a block diagram showing a mobile unit.
Figure 2:
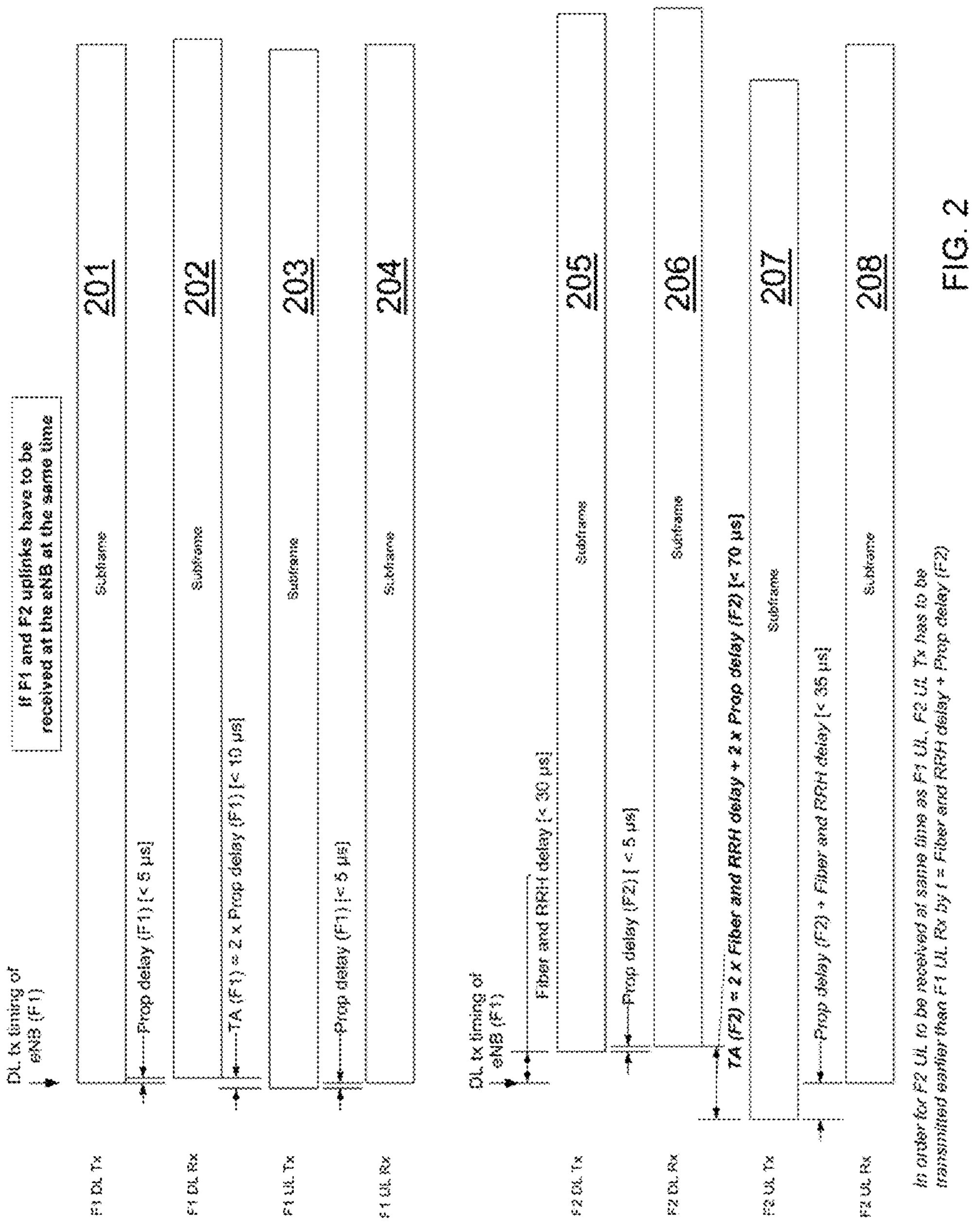
FIG. 2 illustrates timing of uplink and downlink transmissions.

Turning now to the drawings, where like numerals designate like components, FIG. 3 is a block diagram showing user equipment 300. As shown, user equipment 300 comprises logic circuitry 301, receive circuitry 302, and transmit circuitry 303. Logic circuitry 101 comprises a digital signal processor (DSP), general purpose microprocessor, a programmable logic device, or application specific integrated circuit (ASIC) and is utilized to accesses and control transmitter 303 and receiver 302. Receive and transmit circuitry 302-303 are common circuitry known in the art for communication utilizing a well known communication protocol, and serve as means for transmitting and receiving messages.

User equipment 300 may aggregate carriers as described above. More particularly, UE 300 supports carrier aggregation of frequencies on which RRHs are deployed. Thus, UE 300 will have the capabilities to communicate simultaneously over various frequencies to base station 101.

As discussed above, if UE 300 is required to transmit in both subframe n−1 on F1 and subframe n on F2, the power available to transmit the last symbol of subframe n−1 on F1 or the first symbol of subframe n on F2 may be limited. For example, if UE 300 is at the edge of the macro cell, the transmit power during the overlapping symbol may exceed the SAR limit. In order to address these issues, logic circuitry 301 will monitor for any overlap in transmissions on F1 and F2. If an overlap situation is detected, a determination is made by logic circuitry 301 to back off the power for at least one transmission on one frequency.

Power Backoff in Overlapping Symbol if There is a Significant Overlap

Given that UE 300 may be unable to transmit adequate power in last symbol of subframe n on F1 when it overlaps with first symbol of subframe n+1 in F2, it is necessary to apply a power backoff to one of the two transmissions. In this situation, receiver 302 receives an uplink grant for uplink transmission on F1 in subframe n and an uplink grant for uplink transmission on F2 in subframe n+1. Logic circuitry 301 then determines a symbol in which there is an overlap of transmissions on F1 and F2 and further determines if the required combined transmit power exceeds the power that can be allocated. If the transmit power exceeds the limit, logic circuitry 301 then determines a required power backoff for F1 or F2 (or both). Logic circuitry 301 then applies the power backoff to F1 or F2 (or both) in just the overlapping symbol.

Figure 4:
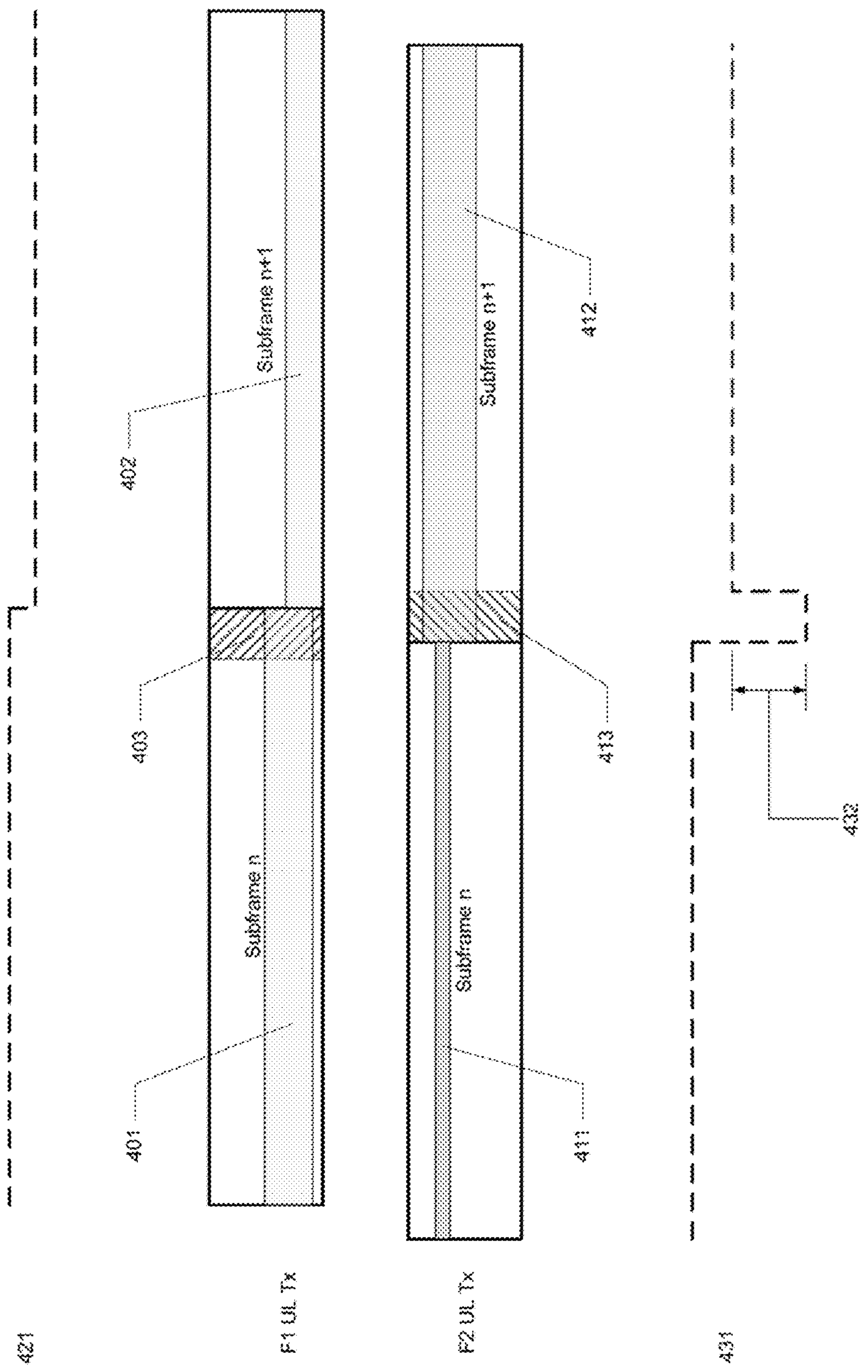
FIG. 4 illustrates a power backoff to a first or a second transmission.

This is illustrated in FIG. 4. The UE is provided an uplink grant in subframe n on F1 (401) and an uplink grant in subframe n+1 on F1 (402). The UE is also provided an uplink grant in subframe n on F2 (411) and an uplink grant on subframe n+1 on F2 (412). The last ofdm symbol of subframe n on F1 (403) overlaps the first ofdm symbol of subframe n+1 on F2 (413). F1 is the prioritized carrier. The required total transmit power in the overlapping period exceeds the maximum allowed transmit power. Dotted line 421 represents the power variation in time across subframes n and n+1 on F1. Dotted line 431 represents the power variation in time across subframes n and n+1 on F2. The UE applies a power backoff in the first ofdm symbol of subframe n+1 on F2 (432).

Prioritization of a Carrier and Applying a Backoff to the Other Carriers

Logic circuitry 301 can prioritize either F1 or F2 for power backoff based on some criteria. For example:

- A Sounding Reference Signal (SRS) is transmitted by the UE in the last symbol of a subframe (if configured). Reducing transmit power of SRS can cause the base station to take actions such as increasing uplink resource allocation sizes. So, if UE 300 is configured to transmit SRS in the last symbol of subframe n on F1, it can apply a power backoff only to the uplink transmission on F2.
- Similarly, reducing power on a symbol that carries the Physical uplink control channel (PUCCH) payload can have negative effects. So, if user equipment 300 is configured to transmit PUCCH in subframe n on F1 or F2 it can apply power backoff only to the uplink transmission that does not carry PUCCH.
- Both F1 and F2 may carry critical signals in the overlapping subframe For example, UE could be configured to transmit PUCCH for all CCs of band1 on F1 and PUCCH for all CCs of band2 on F2, or UE could be configured to transmit PUCCH on F1 and Physical uplink shared channel (PUSCH) with uplink control information (UCI) on F2. Then logic circuitry 301 can apply power backoff to one of the two signals, say on F2, and indicate to the network via the signal on F1 that a backoff is applied to the signal on F2. For example, if user equipment 300 is configured to transmit PUCCH on F1 in subframe n and PUCCH on F2 in subframe n+1, UE can apply a power backoff to the first symbol of subframe n−1 on F2 and indicate to the network in PUCCH on F1 that a power backoff has been applied on the first symbol of subframe n−1.

Applying Power Backoff to an Entire Subframe even when one a Symbol Overlap Occurs:

Another option is to apply power backoff that is applied for simultaneous transmission of F1 and F2 even when there is a single symbol overlap between the two symbols. When receiver 302 receives an uplink grant for uplink transmission on F1 in subframe n and an uplink grant for uplink transmission on F2 in subframe n+1, logic circuitry 301 determines a symbol in which there is an overlap of transmissions on F1 and F2 and further determines if the required combined transmit power exceeds the power that can be allocated (threshold power). If the threshold power is exceeded, logic circuitry 301 applies a power backoff required for simultaneous transmission on F1 and F2 (even though the overlap is only one symbol). That is, user equipment 300 behaves as if subframe n on F1 and subframe n+1 on F2 are exactly time aligned.

Changing Power at Slot Boundary:

Applying power backoff to entire subframe (C) is inefficient. On the other hand, applying power backoff to just the overlapping symbol can make decoding difficult at the base station (if a power backoff is applied to just the overlapping symbol, the power at which the overlapping symbol is transmitted is different from the remaining symbols of the subframe). It is beneficial to apply the power backoff to the slot containing the overlapping symbol. Given that there is a demodulation reference symbol (DMRS) transmission in each slot, this enables the base station 300 to decode the uplink transmission more reliably.

Figure 5:
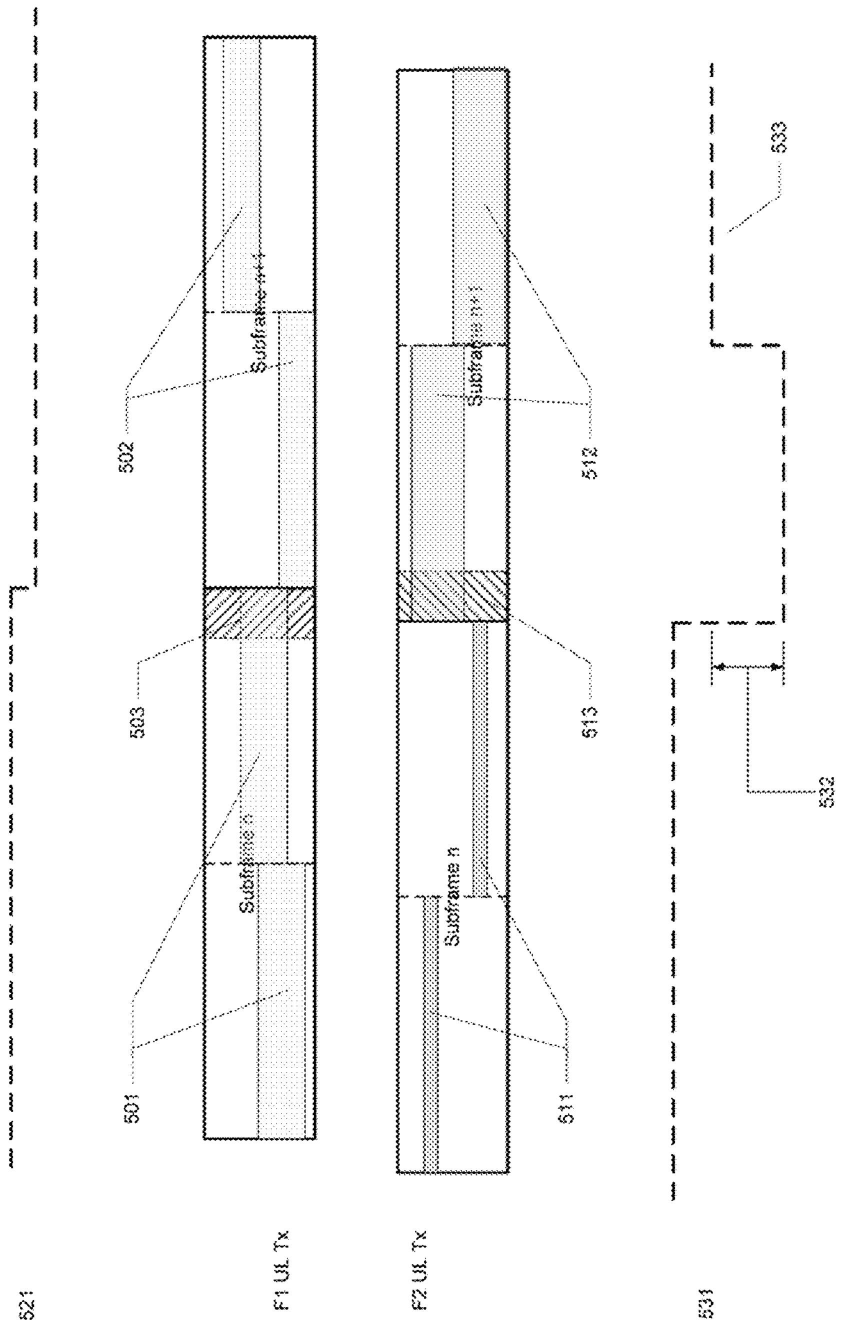
FIG. 5 illustrates power backoff to a slot containing overlapping symbols.

Applying the power backoff to the slot containing the overlapping symbol is illustrated in FIG. 5. The UE is provided an uplink grant in subframe n on F1 (501) and an uplink grant in subframe n+1 on F1 (502). The UE is also provided an uplink grant in subframe n on F2 (511) and an uplink grant on subframe n+1 on F2 (512). The last ofdm symbol of subframe n on F1 (503) overlaps the first ofdm symbol of subframe n+1 on F2 (513). F1 is the prioritized carrier. The required total transmit power in the overlapping period exceeds the maximum allowed transmit power. Dashed line 521 represents the power variation in time across subframes n and n+1 on F1. Dashed line 531 represents the power variation in time across subframes n and n+1 on F2. The UE applies a power backoff in the first slot of subframe n+1 on F2 (532) and does not apply the power backoff to the second slot of subframe n+1 of F2 (533).

Shifting/Modifying the Transient Period:

UE 300 is allowed a "transient period" between successive slots to make power adjustments. Power adjustments at slot boundaries are necessitated because the resource allocation in the two slots may be different. The transient period is used to adjust (increase or decrease) power to the required level. It typically spans a short duration before the slot boundary and a short duration after the slot boundary (~20 microseconds before and 20 microseconds after the slot boundary for a total of 40 microseconds).

The transient period can be adapted as follows:

1. Receiver 302 receives an uplink grant for uplink transmission on F1 in subframe n and an uplink grant for uplink transmission on F2 in subframe n−1.
2. Logic circuitry 301 determines a overlapping period in which there is an overlap of transmissions on F1 and F2.
3. Logic circuitry 301 regards the overlapping period as a transient period. In the two carrier case, the transient period of one of the two carriers can be shifted. The transient period at the start of the subframe of the carrier with the larger TA is delayed so that it is contained within the first symbol of the subframe. (Alternatively, the transient period at the end of the subframe of the carrier with the smaller TA is advanced so that it is contained within the last symbol of the subframe). Shifting the transient period so that it is contained within the symbol that overlaps allows user equipment 300 flexibility in power adjustment (It is assumed that UE varies power during the transient period). Therefore, this approach allows user equipment 300 to handle the overlap period without applying any power backoffs.

Figure 6:
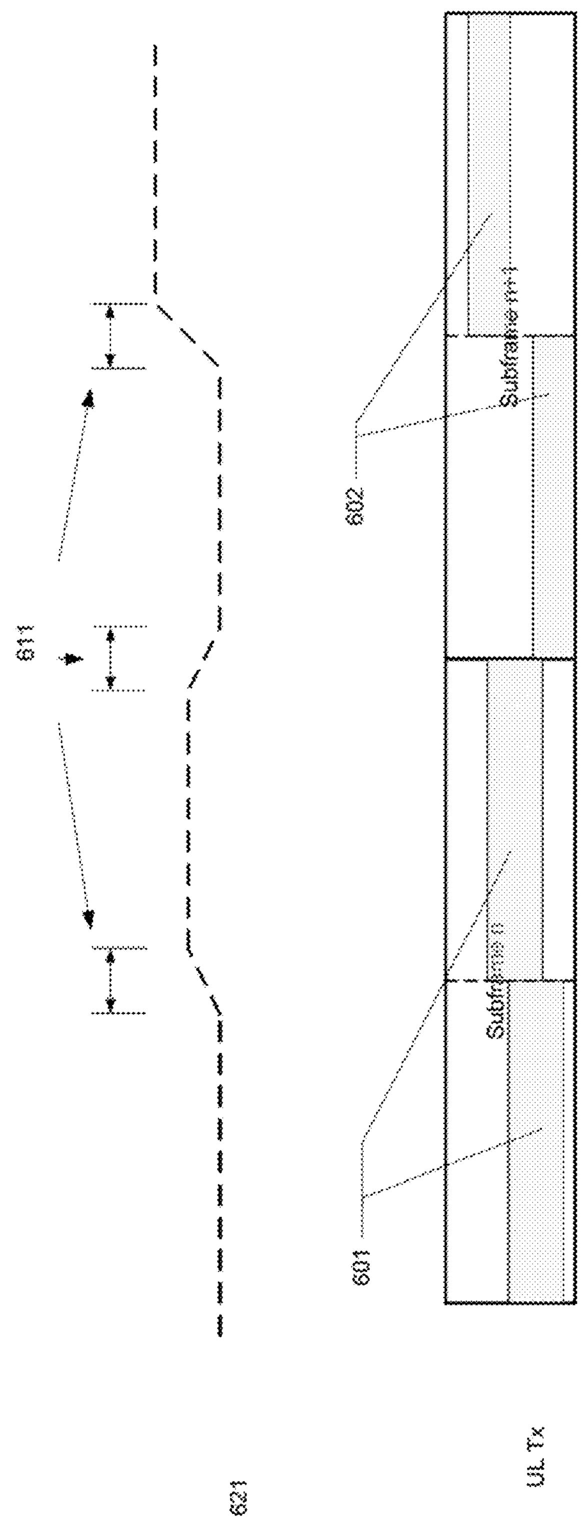
FIG. 6 illustrates the operation of power adjustments during transient periods.

FIG. 6 illustrates the operation of power adjustments during transient periods. The UE is provided an uplink grant in subframe n (601) and an uplink grant in subframe n+1 (602). The resources on which the UE transmits can change from the first slot to the second slot in a subframe. The UE adjusts its transmit power at the transition from slot 1 to slot 2 of each subframe during transient periods (611). Dashed line 621 represents the variation of transmit power across subframe n and subframe n+1.

Figure 7:
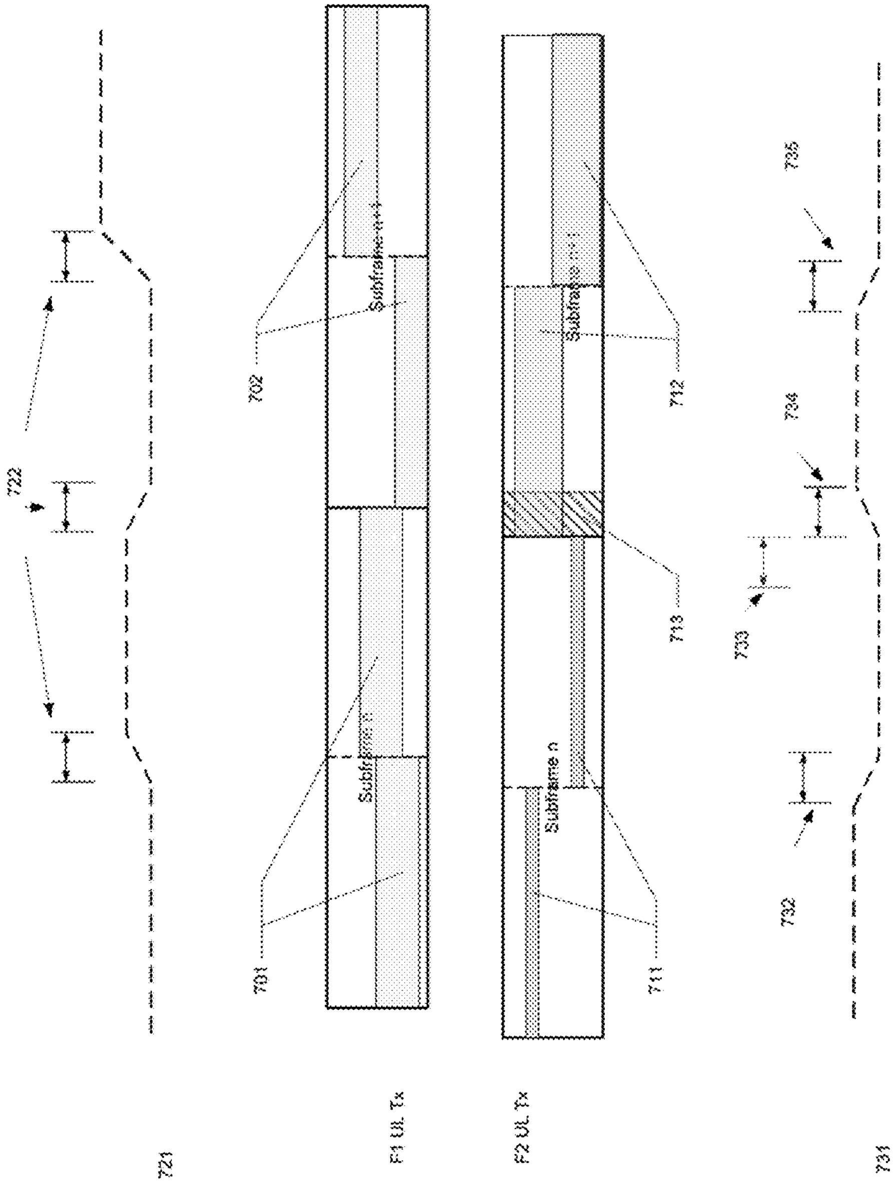
FIG. 7 illustrates the application of transient periods to advantageously overcome the problems of exceeding a maximum power level during transmissions.

FIG. 7 illustrates the application of transient periods to advantageously overcome the problems as described above. The UE is provided an uplink grant in subframe n on F1 (701) and an uplink grant in subframe n+1 on F1 (702). The UE is also provided an uplink grant in subframe n on F2 (711) and an uplink grant on subframe n+1 on F2 (712). The last ofdm symbol of subframe n on F1 overlaps the first ofdm symbol of subframe n+1 on F2 (713). F1 is the prioritized carrier. The required total transmit power in the overlapping period exceeds the maximum allowed transmit power. Dashed line 721 represents the power variation in time across subframes n and n+1 on F1. Dashed line 731 represents the power variation in time across subframes n and n+1 on F2. Time periods 722 represents the transient periods on F1. Time periods 732, 733 and 735 represent the original transient periods on F2. The UE shifts the original transient period 733 to a new transient period 734, such that the new transient period overlaps the first ofdm symbol of subframe n+1 on F2 (713).

Puncturing of First/Last Symbol of Non-Prioritized CCs:

1. Logic circuitry 301 determines a prioritized component carriers among the uplink CCs on which it is to transmit. The prioritized CC may be the primary CC or the CC carrying physical uplink control channel (PUCCH). It can also be the CC carrying PUSCH with uplink control information (UCI). UE allocates the power required for the prioritized CC for the subframe.
2. For transmission on non-prioritized CCs logic circuitry 301 instructs transmitter 303 to puncture symbols (i.e., use zero transmit power) as follows:
   a. If the timing advance (TA) of a non-prioritized CC is greater than the TA of the prioritized CC, then puncture the first symbol of the non-prioritized CC.
   b. If TA of a non-prioritized CC is less than the TA of prioritized CC, then puncture the last symbol of the non-prioritized CC.

Note: 'a'/'b' above are done only when the total required power in the first/last symbol of the non-prioritized CC exceeds the maximum allowed transmit power.

Figure 8:
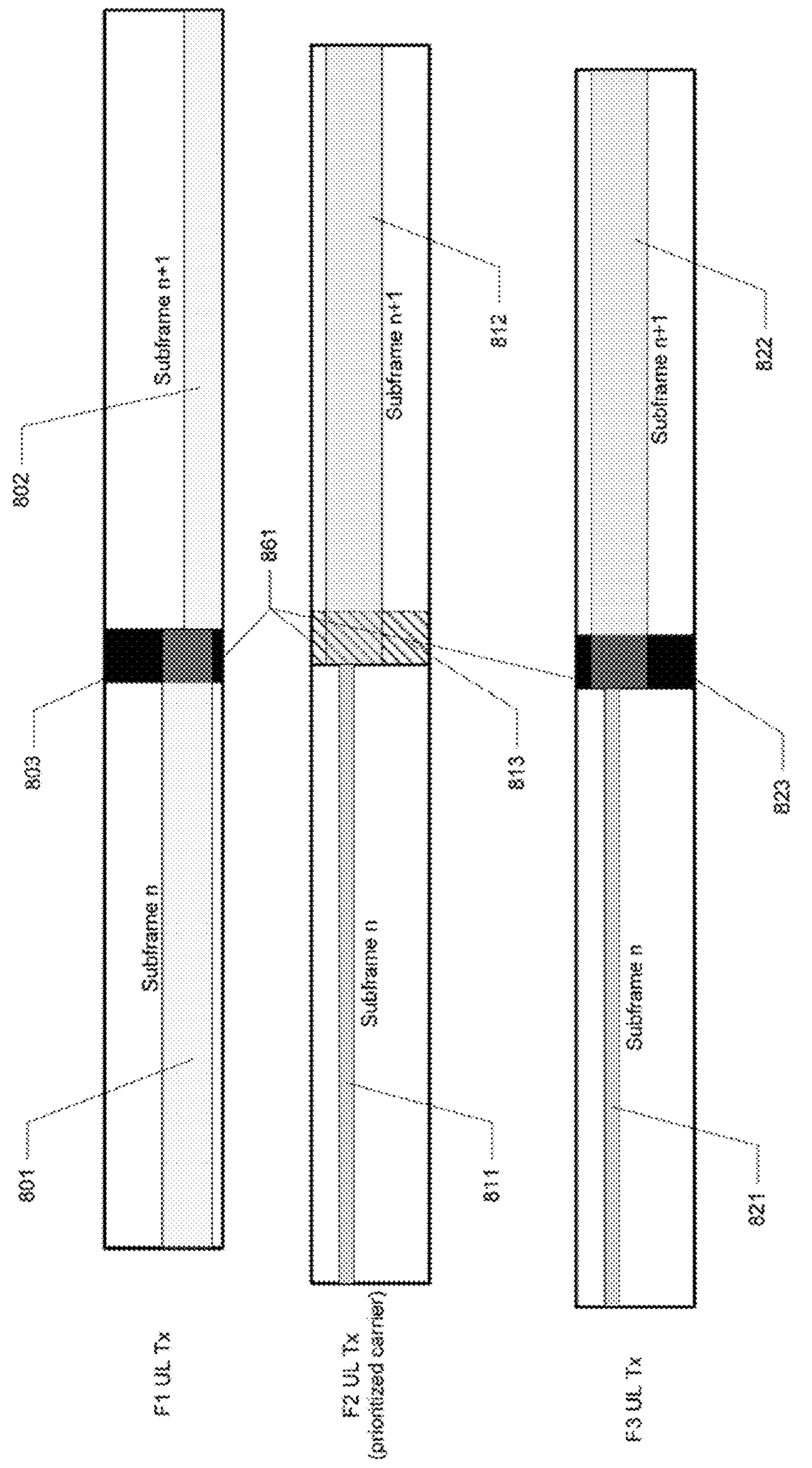
FIG. 8 illustrates puncturing symbols for power control.

Symbol puncturing is illustrated in FIG. 8. The UE is provided an uplink grant in subframe n on F1 (801) and an uplink grant in subframe n+1 on F1 (802). The UE is provided an uplink grant in subframe n on F2 (811) and an uplink grant on subframe n+1 on F2 (812). The UE is provided an uplink grant in subframe n on F3 (821) and an uplink grant on subframe n+1 on F3 (822).The last ofdm symbol of subframe n on F1 (803) overlaps the first ofdm symbol of subframe n+1 on F2 (813), and the last ofdm symbol of subframe n on F2 overlaps the first ofdm symbol on F3 (823). F2 is the prioritized carrier. The required total transmit power in the overlapping periods exceeds the maximum allowed transmit power (861). The timing advance for carrier F1 is less than the timing advance for carrier F2; so the UE can puncture the last ofdm symbol of subframe n on F1 (803). The timing advance of carrier F3 is greater than the timing advance of carrier F2; so the UE can puncture the first ofdm symbol of subframe n+1 on carrier F3 (823).

Allocating Available Power Among Non-Prioritized Frequencies:

1. Logic circuitry 301 determines a prioritized CC among the uplink CCs on which it is to transmit. The prioritized CC may be the primary CC or the CC carrying PUCCH. It can also be the CC carrying PUSCH with UCI. It can also be the CC with the smallest TA value. Logic circuitry 301 then allocates the power required for the prioritized CC for the subframe.
2. For transmission of a first slot of subframe n of each non-prioritized CC i, logic circuitry 301 first determines required power for component carrier. The transmit power $P_{CC}(i)$ is computed as follows:
   a. If TA of CCi is >TA of prioritized CC, $P_{CC}(i)$ is the power required in the first slot of subframe n on CCi.
   b. If TA of CCi is ≤TA of prioritized CC, $P_{CC}(i)$= MAX{power required in the second slot of subframe n−1 on CCi, power required in first slot of subframe n on CCi}.
3. For transmission of the second slot of subframe n of each non-prioritized CC i, logic circuitry 301 first determines a required power for CC i. $P_{CC}(i)$ is computed as follows:
   a. If TA of CCi is >TA of prioritized CC, $P_{CC}(i)$= MAX{power required for first slot of subframe n+1 on CCi, power required for second slot of subframe n on CCi}.
   b. If TA of CCi is ≤TA of prioritized CC, $P_{CC}(i)$ is the power required for the second slot of subframe n on CCi.

Note that the above solution requires a comparison of power required in subframe n+1 to power required in subframe n to determine final power allocation. This requires user logic circuitry 301 to take into account the UL grant in subframe n+1 earlier (i.e., "look ahead") than it would otherwise have.

An Alternate way of Allocating Available Power Among Non-Prioritized CCs:

1. Logic circuitry 301 determines a prioritized CC among the uplink CCs on which it is to transmit. The prioritized CC may be the primary CC or the CC carrying PUCCH. It can also be the CC carrying PUSCH with UCI. It can also be the CC with the smallest TA value. UE allocates the power required for the prioritized CC for the subframe.
2. For transmission of first slot of subframe n of each non-prioritized CC i, logic circuitry 301 first determines a $P_{CC}(i)$. After computing the all the $P_{CC}(i)$, Logic circuitry 301 then distributes available power among the non-prioritized CCs by assigning weights to different CCs (e.g., by distributing available power in proportion to $P_{CC}(i)$). $P_{CC}(i)$ is computed as follows:
   a. If TA of CCi is >TA of prioritized CC, $P_{CC}(i)$ is the power required in the first slot of subframe n on CCi.
   b. If TA of CCi is ≤TA of prioritized CC, $P_{CC}(i)$= MAX{power required in the second slot of subframe n−1 on CCi, power required in first slot of subframe n on CCi}.
3. For transmission of the second slot of subframe n of each non-prioritized CC i, logic circuitry 301 first determines a $P_{CC}(i)$. After computing the all the $P_{CC}(i)$, UE distributes available power among the non-prioritized CCs by assigning weights to different CCs (e.g., by distributing available power in proportion to $P_{CC}(i)$). $P_{CC}(i)$ is computed as follows:
   a. If TA of CCi is >TA of prioritized CC, $P_{CC}(i)$=is a predetermined power value. For example, this predetermined power value can be $P_{cmax,c}$ for CCi.
   b. If TA of CCi is ≤TA of prioritized CC, $P_{CC}(i)$ is the power required for the second slot of subframe n on CCi.

Note that the above solution does not require comparison of power required in subframe n+1 to power required in subframe n to determine final power allocation.

An Alternate way of Allocating Available Power Among Non-Prioritized CCs

Power can be allocated to CCs by logic circuitry 301 in the order of their transmission time. That is, for subframe n, the CC with the largest TA (if scheduled for uplink transmission) is allocated the power it needs. Then the CC with the next largest TA is allocated the power it needs, and so on.

Informing the Network of a Power Backoff:

Applying a power backoff implies that the UE allocates less power to at least some transmissions than the network expects. It is beneficial to inform the network of the power limitation at the UE. The network can then schedule to avoid overlaps or perform resource allocation appropriately when an overlap occurs. The mechanism used to inform the base station about power limitations at the UE is the power headroom reporting (PHR) procedure.

The current power headroom computation procedure assumes that uplink subframes are aligned. If there is a partial overlap as outlined above (last symbol of subframe n on F1 overlaps first symbol of subframe n+1 on F2), the PH computed in this manner would be incorrect.

PHR computation is (slightly different based on the type of transmission involved). Taking the example of Type 1 PHR when only PUSCH is transmitted, power headroom is computed as follows:

$$PH_{type1,c}(i)=P_{CMAX,c}(i)-\{10\log_{10}(M_{PUSCH,c}(i))+P_{O\_PUSCH,c}(j)+\alpha_c(j)\cdot PL_c+\Delta_{TF,c}(i)+f_c(i)\}$$

where $P_{CMAX,c}(i)$ is the maximum allowed power for the component carrier, and the term in {} represents the power required for transmitting a transport block according to the allocated uplink grant.

Figure 9:
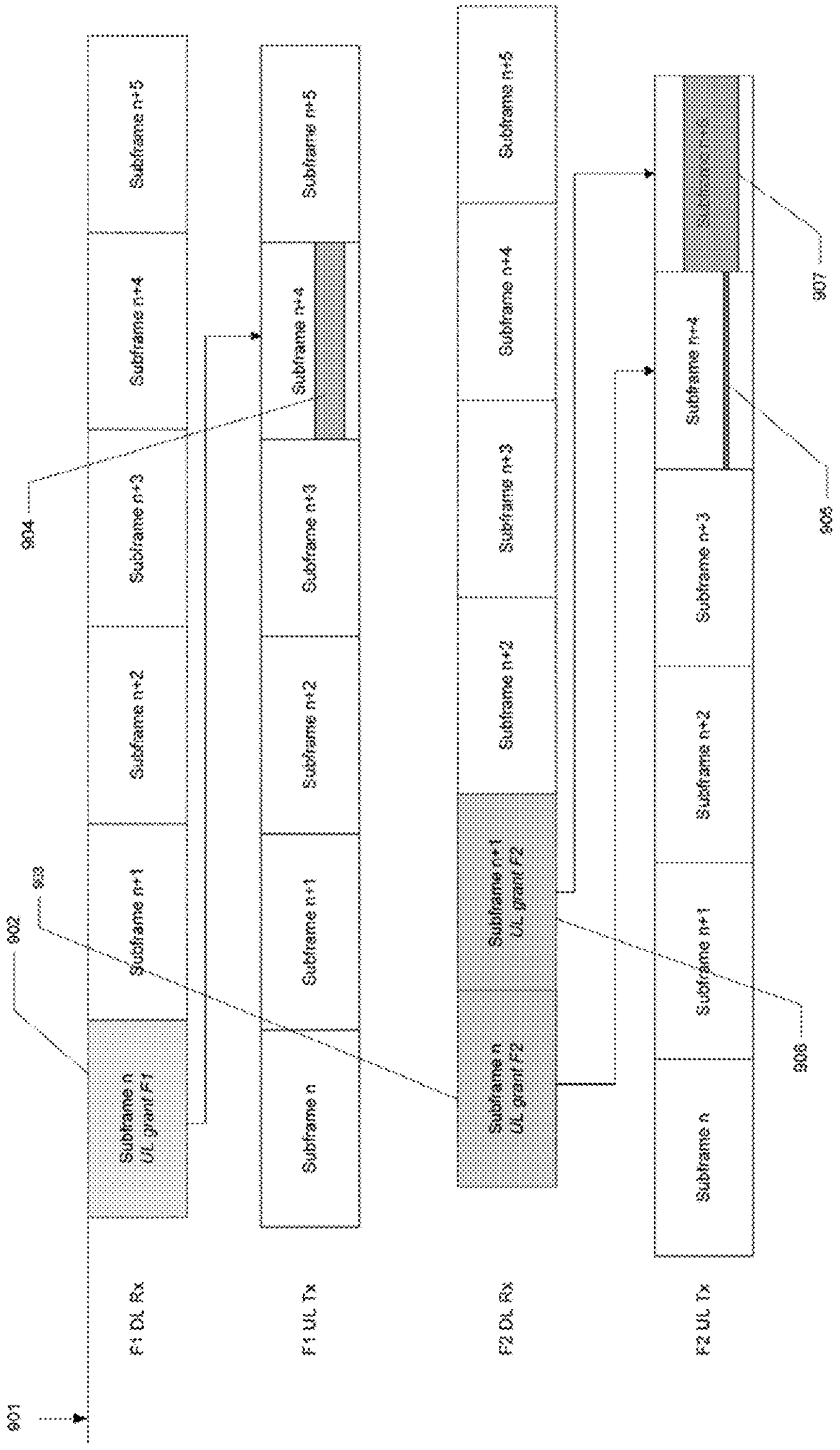
FIGS. 9 and 10 illustrate a timeline for the power headroom computation.

FIG. 9 illustrates a timeline for the power headroom computation. At 901 a power headroom report is triggered. UE receives uplink grants in subframe 902 on F1 and in subframe 903 on F2. The corresponding grant usage subframes n+4 have resource allocations 904 and 905 on F1 and F2 respectively. UE also receives an uplink grant in subframe 906 and the corresponding grant usage subframe n+5 has a resource allocation 907. The power headroom report based on grant usage subframe 904 and 905 does not take into account the power required for the transmission in the portion of the transmission in resource allocation 907 that overlaps the transmission in resource allocation 904.

When a PHR is triggered, if a particular CC does not have an uplink grant, the UE is required to use predefined parameters to compute the term in {} (also known as reference grant). This leads to power headroom computations that do not reflect the power limitations in the overlapping symbol of subframe n on F1 and subframe n+1 of F2. For example, consider the scenario in FIG. 3. A PHR is to be transmitted based on subframe n (for example due to a downlink pathloss change on F1). UE computes PH for F1 based on the uplink grant in subframe n; and since UE does not have an UL grant in subframe n on F2, it uses a reference grant to compute PH for F2. The UE transmits a PHR consisting of the computed PHs for F1 and F2 to the network.

Figure 10:
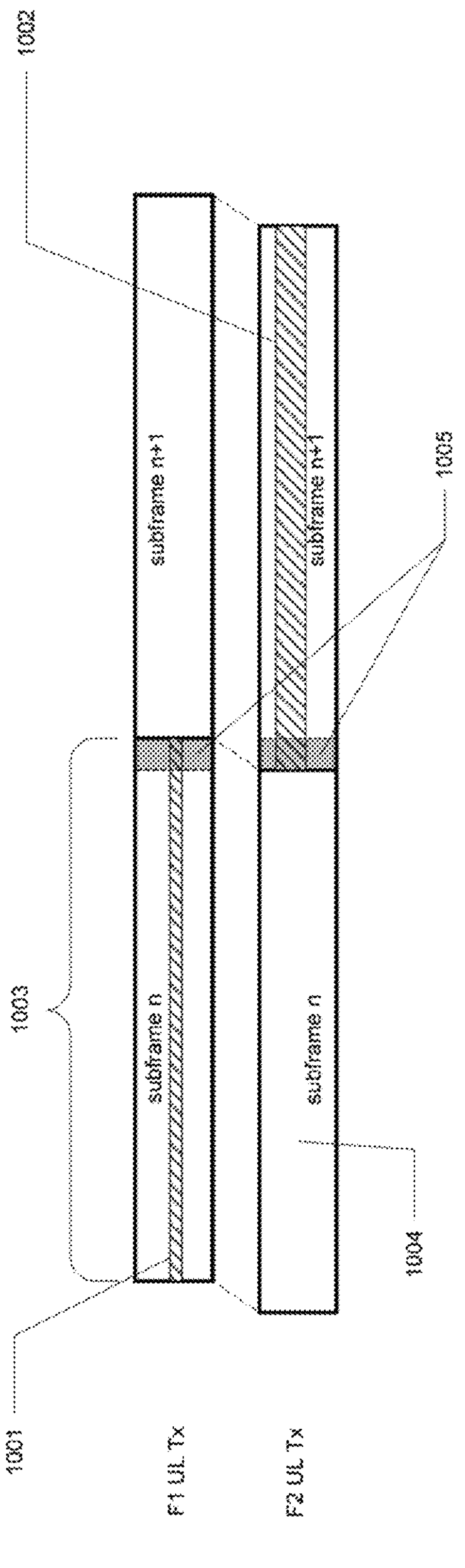

This is illustrated in FIG. 10. This is illustrated in FIG. 10. The UE has an uplink resource allocation 1001 in subframe n on F1. The UE has an uplink resource 1002 in subframe n+1 on F2. A power headroom report has been triggered and the UE computes power headroom based on subframe n of F1 and F2. The UE does not have any uplink resources assigned in subframe n on F2 (1004). The power headroom computation is based on the resource allocation 1001 in subframe n on F1 and a predefined resource allocation in subframr n on F2. The power headroom does not take into account the resource allocation 1002 in subframe n+1 on F2. Thus, power required in the overlapping ofdm symbol (1005)—i.e., the last ofdm symbol of subframe n on F1 and the first ofdm symbol of subframe n+1 on F2—is not reflected in the power headroom report.

Figure 11:
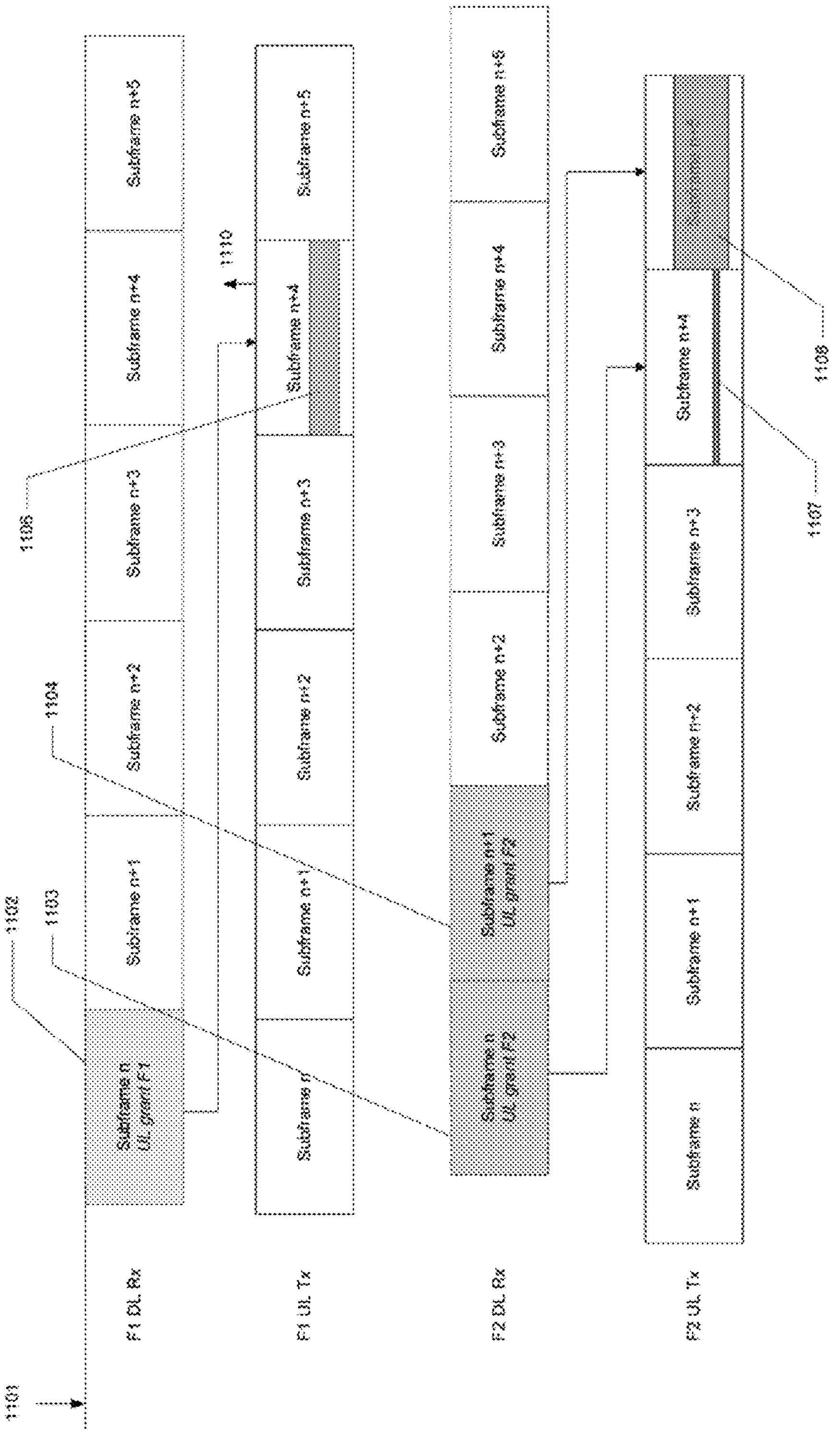
FIG. 11 and FIG. 12 illustrate computation of a more precise power headroom.

FIG. 11 illustrates computation of a more precise power headroom. More particularly, logic circuitry 301 computes power headroom for the triggering carrier based on the identified subframe (in the above case, PH for F1 based on subframe n). Logic circuitry 301 then computes two PHs for F2:

(a) one based on subframe n and, (b) the other based on subframe n+1. Logic circuitry 301 then selects the smaller PH value of the two for inclusion in PHR. At 1101 a power headroom report is triggered. UE receives uplink grants in subframe 1102 on F1 and in subframe 1103 on F2. The corresponding grant usage subframes are subframes n+4 with resource allocations 1106 and 1107 on F1 and F2 respectively. UE also receives an uplink grant in subframe 1104 on F2 and the corresponding grant usage subframe is n+5 with resource allocation 1108. The UE computes a power headroom for F1 based on resource allocation 1106. For F2, UE computes a first power headroom based on resource allocation 1107 and a second power headroom based on resource allocation 1108. The UE constructs a power headroom report that includes the power headroom for F1 and the smaller of the first and second power headrooms for F2. At 1110 the power headroom is transmitted to the base station.

Additionally, logic circuitry 301 then can include an indication that the reported PHR is based on an overlap between subsequent subframes on different carriers. Furthermore, logic circuitry 301 then can apply the procedure above only when it is approaching a power limit (for example, only when the CA power class minus the planned transmit power is small, indicating that the UE is close to its power limit).

The UE receives an uplink grant in a first subframe referred to herein as a grant reception subframe. The uplink grant assigns to the UE resources for transmission in a second subframe referred to herein as the grant usage subframe. The grant reception subframe and the grant usage subframe are such that the UE is given adequate time to perform processing of the uplink grant and construction of the transport block for transmission. In LTE FDD systems, if subframe n is the grant reception subframe, the grant usage subframe is subframe n+4. In LTE TDD, if subframe n is the grant reception subframe, the grant usage subframe is n+k, where k depends on the uplink/downlink configuration.

We continue the description of the power headroom reporting. The above approach would require logic circuitry 301 to compute PHR after a delay. In order to address this issue, if the TA(F2) is greater than TA(F1) by delta_TA, then:

1. if PHR is triggered, and UE receives an uplink grant, UE first identifies the corresponding grant usage subframe. UE then computes two power headrooms as described above based on the grant usage subframe and the subframe subsequent to the grant usage subframe.
2. UE does not transmit PHR in the grant usage subframe; instead the UE delays transmission (of the same PHR) to the next available uplink grant. Additionally, the UE may include an indication of the subframes on which the power headroom computations were based.

Symbol Level PHR

Another option is to define a symbol level PHR. The symbol level PHR provides the base station an indication of the power headroom for a symbol of one subframe on a carrier that overlaps a symbol of a previous or subsequent subframe on a different carrier. In this solution, logic circuitry 301 identifies a symbol number and reports PH for it (either as a delta relative to the normal PH or an absolute value). For example, UE reports a symbol level PHR for F2 for the overlapping symbol in addition to the regular PHR for F2 (based on subframe n).

Figure 12A:
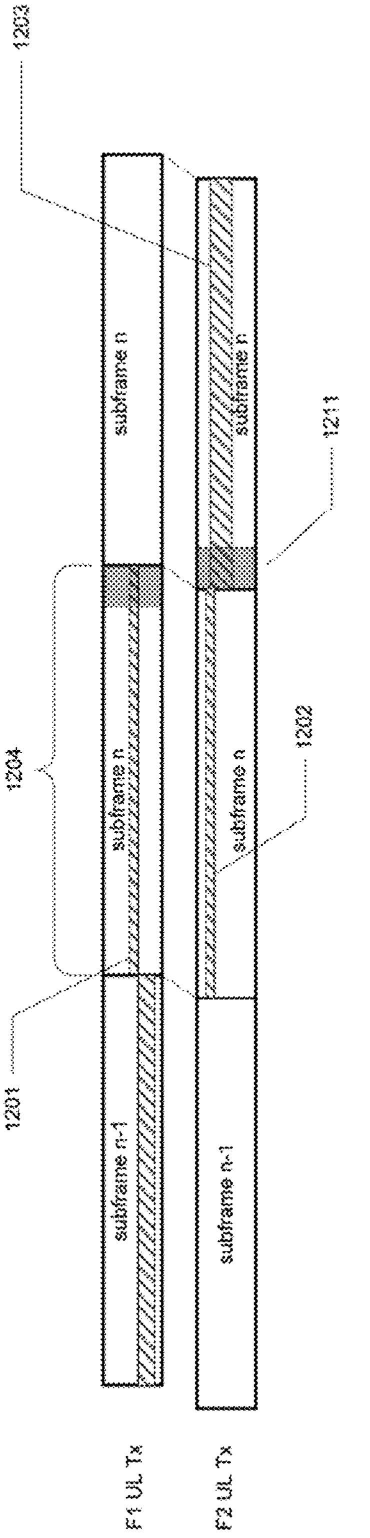
Figure 12B:
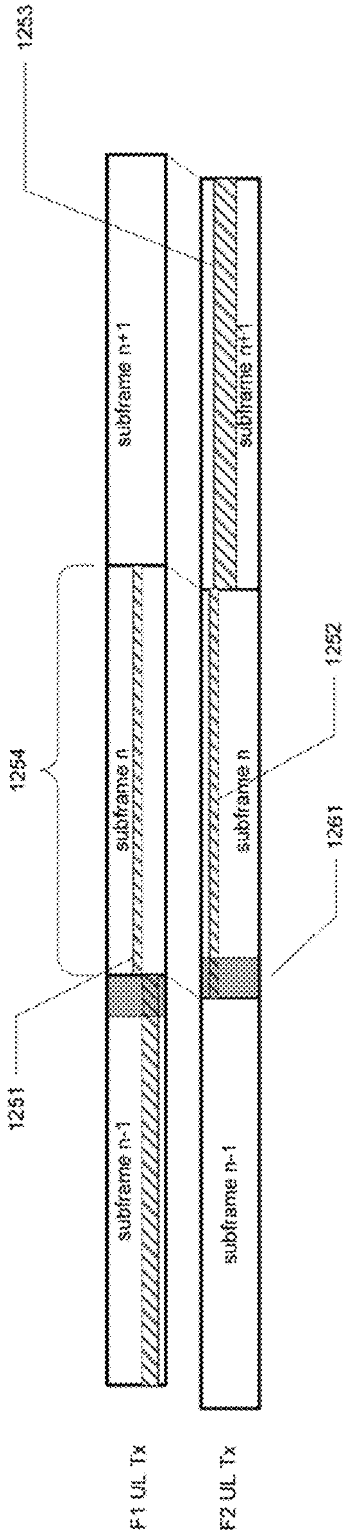

One approach is to compute and report the symbol level PH for the first symbol of a subframe subsequent to a grant usage subframe of the carrier with the larger TA (F2). This requires the UE to first know the UL allocation in the subframe subsequent to a grant usage subframe. Given that UE 103 does not see the UL allocation for the subframe subsequent to a grant usage subframe until one subframe after the grant reception subframe, the UE may not be able to include the symbol level PH in the PHR reported in the subframe. Alternatively, the symbol level PH can be computed for the first symbol of a subframe of the carrier with the larger TA. This enables the UE to include the symbol level PH in the PHR reported in the subframe. This is illustrated in FIGS. 12*a* and 12*b*. The UE has an uplink resource allocation 1201 in subframe n on F1 and an uplink resource allocation 1202 in subframe n on F2. The UE has an uplink resource 1203 in subframe n+1 on F2. A power headroom report has been triggered and the UE computes power headroom based on subframe n of F1 and F2 (1204). The power headroom computation is based on the resource allocation 1201 in subframe n on F1 and resource allocation 1202 in subframe n on F2. Alternatively, if the UE does not have a resource allocation in subframe n on F2, a reference resource allocation is used. The UE also computes a symbol level power headroom for a symbol that overlaps. For example, the UE computes a power headroom for the first symbol 1211 of subframe n+1 on F2. The symbol level power headroom indicates the power headroom available during the transmission in that symbol. The symbol level power headroom can be included in a power headroom report transmitted in subframe n. If processing time is not adequate for transmission of the power headroom report in subframe n, the symbol level power headroom can be transmitted in a separate report in subframe n+1.

Alternatively, the UE has an uplink resource allocation 1251 in subframe n on F1 and an uplink resource allocation 1252 in subframe n on F2. The UE has an uplink resource 1253 in subframe n+1 on F2. A power headroom report has been triggered and the UE computes power headroom based on subframe n of F1 and F2 (1254). The power headroom computation is based on the resource allocation 1251 in subframe n on F1 and resource allocation 1252 in subframe n on F2. Alternatively, if the UE does not have a resource allocation in subframe n on F2, a reference resource allocation is used. The UE also computes a symbol level power headroom for a symbol that overlaps. For example, the UE computes a power headroom for the first symbol 1261 of subframe n on F2. The symbol level power headroom can be included in a power headroom report transmitted in subframe n.

Figure 13:
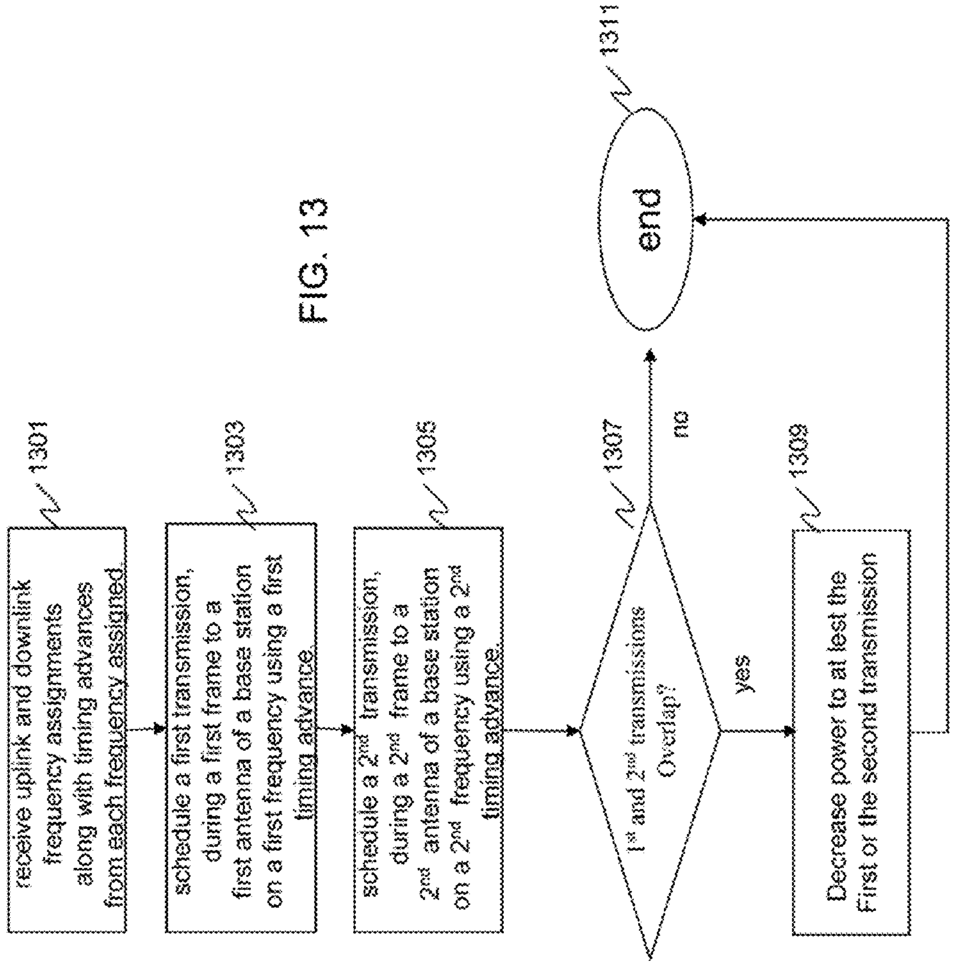
FIG. 13 is a flow chart showing operation of the UE of FIG. 3.

FIG. 13 is a flow chart showing operation of UE 300 of FIG. 3. UE 300 aggregates carriers such that receiver 302 receives base station 101's transmissions from both a base station antenna and RRH 102, each on a differing frequency. In a similar manner transmitter 303 transmits uplink signals to base station 101 by transmitting on a first frequency directly to a base station antenna, and on a second frequency directly to RRH 102. As discussed above, the RRH comprises an antenna that is backhauled to the base station via a wired or fiber link.

The logic flow begins at step 1301 where receiver 302 receives uplink and downlink frequency assignments along with timing advances from each frequency assigned. At step 1303 logic circuitry 301 schedules a first transmission, during a first frame to a first antenna of a base station on a first frequency using a first timing advance. A second transmission is scheduled by logic circuitry at step 1305. The second transmission is scheduled during a second frame, to a second antenna of the base station using a second timing advance. The second frame occurs later than the first frame and the second timing advance is greater than the first timing advance. Logic circuitry 301 then determines if the first transmission and the second transmission will overlap (step 1307) and instructs transmitter 303 to decrease power to at least the first transmission or the second transmission in response to the determination (step 1309). The logic flow ends at step 1311.

As discussed above the step of determining that the first transmission and the second transmission will overlap may comprise determining that an OFDM symbol duration of an n-th subframe on the first transmission overlaps at least partially an OFDM symbol duration on an n+1-th subframe of the second transmission. Additionally, the step of decreasing the power to at least the first or the second transmission may comprise prioritizing the first or the second transmissions prior to decreasing the power of a non-prioritized transmission. Additionally, the step of decreasing the power may comprise decreasing the power for a first duration corresponding to a first slot of an n-th subframe of the first transmission, or may comprise decreasing the power to zero (no transmission).

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for allocating power for overlapping transmissions from user equipment when multiple timing advances are used, the method comprising the steps of:

scheduling, by user equipment, a first transmission to a base station, during a first frame on a first frequency using a first timing advance;

scheduling, by the user equipment, a second transmission to the base station, during a second frame, using a second timing advance, wherein the second frame occurs later than the first frame and the second timing advance is greater than the first timing advance;

determining, by the user equipment, that the scheduled first transmission and the second transmission to the base station will overlap; and decreasing, by the user equipment, power to at least the first transmission or the second transmission in response to the determination that the first transmission and the second transmission using first and second timing advances, will overlap.

2. The method of claim 1 wherein the step of determining that the first transmission and the second transmission will overlap comprises the step of determining that an OFDM symbol duration of an n-th subframe on the first transmission overlaps at least partially an OFDM symbol duration on an n+1-th subframe of the second transmission.

3. The method according to claim 1 wherein the step of decreasing the power to at least the first or the second transmission in response to the determination further comprises the step of prioritizing the first or the second transmissions prior to decreasing the power of a non-prioritized transmission.

4. The method according to claim 1 further comprising the steps of transmitting control information, by the user equipment, including an indication that a power backoff is applied to the first or the second transmission, on a frequency to which no power backoff is applied.

5. The method according to claim 1 wherein the step of decreasing the power comprises the step of decreasing the power for a first duration corresponding to a first slot of an n-th subframe of the first transmission.

6. The method according to claim 1 wherein the step of decreasing the power comprises the step of decreasing the power to zero.

7. The method of claim 1 wherein the second timing advance and a delay from second base station antenna that comprises an antenna that is backhauled to the base station via a wired or fiber link.

8. The method of claim 7 wherein the second antenna comprises a Radio Relay Head (RRH).

9. An apparatus for allocating power for overlapping transmissions when multiple timing advances are used, the apparatus comprising:

logic circuitry scheduling a first transmission, during a first frame to a first antenna of a base station on a first frequency using a first timing advance, scheduling a second transmission, during a second frame, to a second antenna of the base station using a second timing advance, wherein the second frame occurs later than the first frame and the second timing advance is greater than the first timing advance, the logic circuitry determining that the scheduled first transmission and the second transmission to the base station will overlap and decreasing power to at least the first transmission or the second transmission in response to the determination that the first transmission and the second transmission using first and second timing advances, will overlap.

10. The apparatus of claim 9 wherein the logic circuitry determines that the first transmission and the second transmission will overlap by determining that an OFDM symbol duration of an n-th subframe on the first transmission overlaps at least partially an OFDM symbol duration on an n+1-th subframe of the second transmission.

11. The apparatus of claim 10 wherein the logic circuitry decreases the power to at least the first or the second transmission by prioritizing the first or the second transmissions prior to decreasing the power of a non-prioritized transmission.

12. The apparatus of claim 10 further comprising a transmitter transmitting control information, including an indication that a power backoff is applied to the first or the second transmission, on a frequency to which no power backoff is applied.

13. The apparatus of claim 10 wherein the logic circuitry decreases the power by decreasing the power for a first duration corresponding to a first slot of an n-th subframe of the first transmission.

14. The apparatus of claim 10 wherein the logic circuitry decreases the power by decreasing the power to zero.

15. The apparatus of claim 10 wherein the second base station antenna comprises an antenna that is backhauled to the base station via a wired or fiber link.

16. The apparatus of claim 15 wherein the second antenna comprises a Radio Relay Head (RRH).

17. A method for computing power headroom reporting comprising:

receiving, by user equipment, a first resource allocation for a first transmission in a first frame on a first frequency;

receiving, by the user equipment, a second resource allocation for a second transmission in a second frame on a second frequency, wherein the second frame occurs later than the first frame;

determining, by the user equipment, that the first transmission overlaps at least in part a first orthogonal frequency division multiplexing (OFDM) symbol of the second transmission; and transmitting, by the user equipment, a message including a power headroom for the first OFDM symbol of the second frame on the second frequency in response to the determination that the first transmission and the second transmission will overlap.

18. The method according to claim 17 further comprising:

performing, by the user equipment, transmissions on the first frequency using a first timing advance; and performing, by the user equipment, transmission on the second frequency using a second timing advance, wherein the second timing advance is larger than the first timing advance.

* * * * *